W. B. DAHL.
TEMPERATURE REGULATOR.
APPLICATION FILED MAY 26, 1913.

1,097,005.

Patented May 19, 1914.

Witnesses:
Thos. Laggard
Robert W. Muir

Inventor:
Walter B. Dahl.
By G. A. Whiteley,
his Attorney.

UNITED STATES PATENT OFFICE.

WALTER B. DAHL, OF MINNEAPOLIS, MINNESOTA, ASSIGNOR, BY MESNE ASSIGNMENTS, TO B. P. KIMBALL, OF MINNEAPOLIS, MINNESOTA.

TEMPERATURE-REGULATOR.

1,097,005.  Specification of Letters Patent.  Patented May 19, 1914.

Application filed May 26, 1913. Serial No. 769,920.

*To all whom it may concern:*

Be it known that I, WALTER B. DAHL, a citizen of the United States, residing at Minneapolis, in the county of Hennepin and State of Minnesota, have invented certain new and useful Improvements in Temperature-Regulators, of which the following is a specification.

My invention relates to new and useful improvements in temperature regulators and has for its object primarily to effect the securing of temperature regulators such as that described in my co-pending application, Serial No. 727,716, filed October 25, 1912, to the walls of apartments in which said temperature regulators are employed.

In attaching temperature regulators to the wall it is not only necessary to secure the regulator in position, but it is also necessary to make the proper connections of the different wires with the two or more circuits involved in the temperature regulator. In securing such a temperature regulator to the wall it frequently happens that the wiring is disarranged and in many cases false connections are made. This is particularly true because the men who attach temperature regulators are usually plumbers and not electricians.

It is the object of my invention to overcome the aforesaid defects in temperature regulators and difficulties in attaching the same to walls, and to effect this I provide a separate attaching plate to be secured to the wall of the room where it is desired to place the temperature regulator, which plate will be made of insulating material and will have therein the necessary number of contacts properly wired in the circuits which are required to be operated by the thermostat of the temperature regulator. These sets of contacts are insulated one from another, and the casing of the temperature regulator is so constructed that when the casing is secured over the attaching plate, and screwed to the attaching plate, one of said contacts is placed in circuit with the said casing representing the ground wire while the other contacts are severally brought into circuit with the contact posts for the thermostat, by which through movement of the thermostatic finger one or the other of two opposite circuits for effecting operation of the draft regulating motor is closed or opened.

The full objects and advantages of my invention will appear in connection with the detailed description thereof and are particularly pointed out in the claims.

Figure 1:
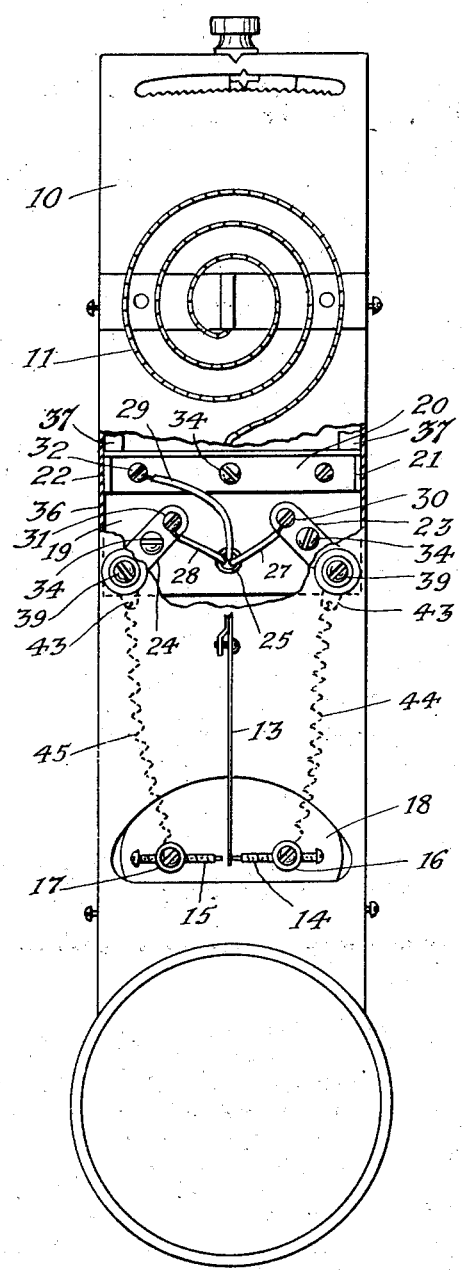
Figure 2:
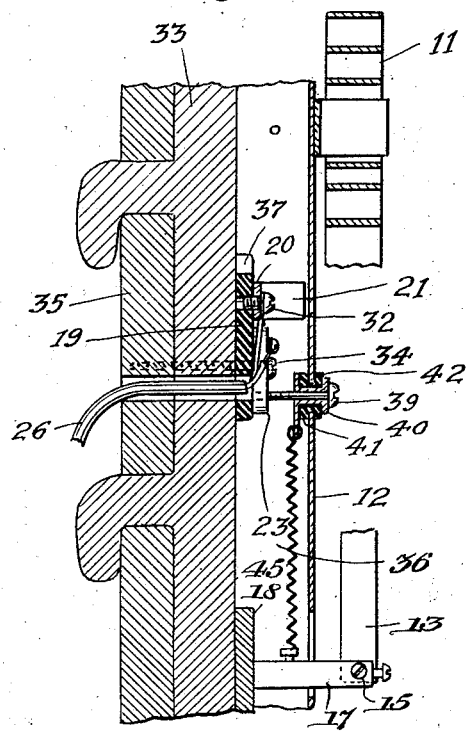
Figure 3:
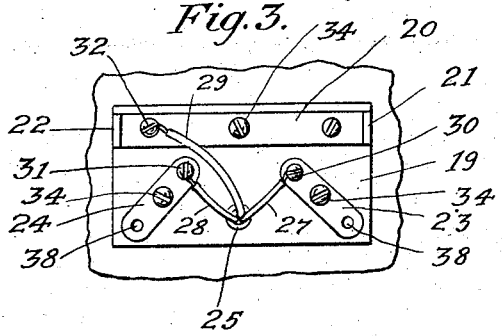

In the drawings, illustrating the application of my invention in one form, Figure 1 is a front elevation of a thermostat secured in position upon a wall by means of one of the aforesaid attaching plates, with some parts broken away. Fig. 2 is a sectional view of a portion of a wall having one of said attaching plates secured thereto and a temperature regulator carried by the attaching plate. Fig. 3 is a front view of the attaching plate separate from the wall.

The temperature regulator 10, as above noted, may be such a temperature regulator as that shown in the co-pending application. A thermostatic lamina 11 is in circuit with the casing 12 of the temperature regulator, and has thereon a switch plate 13 which extends between contact points 14 and 15 carried by posts 16 and 17, said posts being set upon a plate 18 of insulating material so that the contact points 14 and 15 are insulated from the casing 12 and the switch plate 13. In the wiring of such a device heretofore, it has been customary to extend wires from said posts 16 and 17 through the back of the casing 12 to the batteries and motor, the ground wire being carried from the casing 12, and it is the difficulty of properly caring for these wires while securing the thermostat to the wall which my invention seeks to remedy.

In carrying out my invention I provide an attaching plate or block 19, which is formed of insulating material. Along one edge of this plate is secured a metal strip 20 having at the ends thereof upturned projections 21 and 22. Two other metal plates 23 and 24 are secured to the block 19 so as to be insulated from plate 20. Block 19 is provided with an aperture 25 through which extends the end of a cable 26 of well-known construction comprising three independent and insulated wires 27, 28 and 29, which wires are connected by means of screws 30, 31 and 32 with plates 23, 24 and 20, respectively. Of these wires 29 is the ground, and 27 and 28 are the reverse circuit wires which are placed in circuit with the contact points 14 and 15 when the temperature regulator is secured to plate 19, as will hereinafter be pointed out.

As above described, block 19 and parts carried thereby, including the plates 20, 23 and 24 and the wires 27, 28 and 29 connected therewith, is manufactured complete and sent out with the temperature regulator, but not attached thereto. This block 19 is secured to a wall 33 by means of wood screws 34, which extend, preferably, through the respective plates 23, 24 and 20 and the plastering of the wall into lath 35. This fastening is done independently of the temperature regulator and, of course, the operator can easily run the cable 26 through the plastering into the wall spaces back of the same and secure the block 19 in the exact position at which it is desired to fasten the temperature regulator to the wall. A temperature regulator such as I have described is provided with a base having side flanges 36, and the block 19 is made of such width as to just fit within these side flanges. The plate 20 extends across the width of the block so that the upstanding members, or ears, 21 and 22 will contact with a firm, circuit-making pressure with the side flanges 36 when said flanges are slipped over the block 19. Lugs, or stops, 37 on the flanges 36 serve to position the base properly for the final securing thereof to the piece 19. The metal strips 23 and 24 are each provided with a threaded screw-hole 38, and, by means of screws 39 extending through the frame 12 of the temperature regulator and into the plates 23 and 24 and the block 19, the temperature regulator is securely fastened to the piece 19. As best shown in Fig. 2, metallic sockets 40 are provided for screws 39, said sockets being insulated from the frame wall 12 by means of a lower inset washer 41 and an outer washer 42 of insulating material. The socket pieces 40 are of metal and have arms 43 extending therefrom. Wires 44 and 45 connect the arms 43 and socket pieces 40 with contact posts 16 and 17, respectively. It will be apparent, therefore, that when the heat regulator is placed over the screw piece 19 with the side flanges 36 in contact with the ears 21 and the screws 39 extending through metallic socket pieces 40 and into the respective metal pieces 23 and 24 on the block 19, the contact members 14 and 15 will be automatically placed in circuit with the main circuit wires 27 and 28, while the casing 12 of the heat regulator will be placed in circuit with the ground wire 29. The advantages of my invention will be obvious. In use it will permit the securing of devices such as heat regulators to the wall by ordinary mechanics and at the same time that the heat regulator is secured to the wall the proper electric and circuit connection will be effected.

I claim:

1. A temperature regulator comprising a metallic frame and sets of contact points carried thereby and insulated therefrom, a thermostatic member for closing an electric circuit, said circuit including the frame and one or the other of said contact points, and means for securing the temperature regulator to the wall, said securing means having thereon a series of conducting members insulated one from the other and a system of wiring connected with the several conducting members, said conducting members being so positioned that when the temperature regulator is secured to the wall by the securing means the frame and the respective contacting points will be severally put in electrical connection with said conducting members.

2. A temperature regulator comprising a metallic frame and sets of contact points carried thereby and insulated therefrom, a thermostatic member for closing an electric circuit, said circuit including said frame and one or the other of said contact points, a securing block separable from the temperature regulator adapted to be fastened to a wall of the building, a set of electric wires insulated one from the other, and means having electrical connection with such wires for securing the said temperature regulator to the said securing block and holding the same positioned thereby upon the wall, said means operating to put the frame and respective contact points in electrical connection with the respective wires of said system.

3. A temperature regulator comprising a metallic frame having side flanges, a pair of contact points carried thereby and insulated from the frame, a thermostatic member for closing an electric circuit, said circuit including said frame and one or the other of said contact points, a securing block of non-conducting material separable from the temperature regulator adapted to be fastened to a wall of the building, a set of three electric wires insulated one from the other, and means having electrical connection with such wires including a metallic member on the block having engagement with said flanges for securing the said heat regulator to the said securing block and holding the same positioned thereby upon the wall, said means operating to put the frame and respective contact points in electrical connection with the respective wires of said system.

4. A temperature regulator comprising a metallic frame having side flanges, a pair of contact points carried thereby and insulated from the frame, a thermostatic member for closing an electric circuit, said circuit including said frame and one or the other of said contact points, a securing block of non-conducting material separable from the temperature regulator adapted to be fastened to a wall of the building, a metal bar having members thereon for engagement with said flanges, a set of electric wires insulated one from the other, one of said wires being connected with the metal bar, and means for simultaneously securing the heat regulator to the securing block and effecting electrical connection between the contact points and the other wires, respectively.

5. A temperature regulator comprising a metallic frame and a pair of contact points carried thereby and insulated therefrom, a thermostatic member for closing an electric circuit, said circuit including said frame and one or the other of said contact points, a securing block of non-conducting material separable from the temperature regulator adapted to be fastened to a wall of the building, said securing block having thereon a metal strip adapted to contact with the frame and two metal screw receiving pieces, three electric wires insulated from one another and having respective connection with said metal strip and pieces on the securing block, a pair of screw sockets formed in the frame and insulated therefrom, each of said screw sockets being in electrical connection with one of said contact points, and screws extending through said sockets for entering the screw pieces and simultaneously acting to secure the temperature regulator to the block and put the respective contact points in electrical connection with the screw piece wires.

6. A temperature regulator comprising a metallic frame, a pair of contact points carried thereby and insulated from the frame, a thermostatic member for closing an electric circuit, said circuit including said frame and one or the other of said contact points, a securing block separable from the temperature regulator and adapted to be fastened to the wall, said securing block comprising metallic and non-conducting portions, the metallic portion being provided with members for engagement with the said metallic frame, a set of electric wires insulated one from the other, one of said wires being connected with the metallic portion of the block, and means for effecting electrical connection between the contact points and the other wires, respectively, when the heat regulator is secured to the securing block.

In testimony whereof I affix my signature in presence of two witnesses.

WALTER B. DAHL.

Witnesses:
H. A. BOWMAN,
ROBERT W. MUIR.

---

Copies of this patent may be obtained for five cents each, by addressing the "Commissioner of Patents, Washington, D. C."